(12) United States Patent
Song et al.

(10) Patent No.: US 12,295,051 B2
(45) Date of Patent: *May 6, 2025

(54) COMMUNICATING CONTROL DATA IN A WIRELESS COMMUNICATION NETWORK

(71) Applicant: Telefonaktiebolaget LM Ericsson (publ), Stockholm (SE)

(72) Inventors: Xinghua Song, Beijing (CN); Shaohua Li, Beijing (CN); Jinhua Liu, Beijing (CN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 18/199,775

(22) Filed: May 19, 2023

(65) Prior Publication Data

US 2023/0300920 A1    Sep. 21, 2023

Related U.S. Application Data

(63) Continuation of application No. 17/155,910, filed on Jan. 22, 2021, now Pat. No. 11,665,756, which is a
(Continued)

(30) Foreign Application Priority Data

Jan. 30, 2015    (WO) ................ PCT/CN2015/071894

(51) Int. Cl.
*H04W 76/14*    (2018.01)
*H04L 5/00*    (2006.01)

(52) U.S. Cl.
CPC ............. *H04W 76/14* (2018.02); *H04L 5/001* (2013.01); *H04L 5/0053* (2013.01)

(58) Field of Classification Search
CPC ....... H04W 76/14; H04L 5/001; H04L 5/0053
See application file for complete search history.

(56) References Cited

U.S. PATENT DOCUMENTS 8,670,410 B2    3/2014  Lue et al.
8,923,223 B2   12/2014  Chen et al.
(Continued)

FOREIGN PATENT DOCUMENTS

CN    103098409 A    5/2013
CN    103098536 A    5/2013
(Continued)

OTHER PUBLICATIONS

CATT, "Periodic CSI reporting for multiple DL CCs in LTE-A Rel-11", 3GPP TSG RAN WG1 Meeting #69, Prague, Czech Republic, May 21-25, 2012, pp. 1-4, R1-122024.
(Continued)

*Primary Examiner* — Diane D Mizrahi
(74) *Attorney, Agent, or Firm* — COATS & BENNETT, PLLC

(57) ABSTRACT

The present invention relates to methods for sending or receiving control data in one or multiple uplink control channel resources of a wireless communication network and to corresponding devices. According to one embodiment of the invention a method of sending control data in one or multiple uplink control channel resources of a wireless communication network is provided. A wireless device receives, from a network node, information on a set of downlink component carriers configured for the wireless device. The wireless device receives, from a network node, an indication of the one or multiple uplink control channel resources. The wireless device maps first control data comprising control data for the set of configured downlink component carriers to a part of the one or multiple uplink control channel resources. And the wireless device maps
(Continued)

second control data to a remaining part of the one or multiple uplink control channel resources.

28 Claims, 11 Drawing Sheets

Related U.S. Application Data continuation of application No. 16/716,882, filed on Dec. 17, 2019, now Pat. No. 10,904,934, which is a continuation of application No. 15/544,296, filed as application No. PCT/EP2016/051964 on Jan. 29, 2016, now Pat. No. 10,536,984.

(56) References Cited

U.S. PATENT DOCUMENTS

| | | | |
|---|---|---|---|
| 9,106,419 | B2 | 8/2015 | Chen et al. |
| 9,131,481 | B2 | 9/2015 | Nakashima et al. |
| 9,363,811 | B2 | 6/2016 | Enomoto et al. |
| 9,554,297 | B2 | 1/2017 | Han et al. |
| 9,686,776 | B2 | 6/2017 | Liang et al. |
| 9,729,273 | B2 | 8/2017 | Khoshnevis et al. |
| 9,877,290 | B2 | 1/2018 | Aiba et al. |
| 9,918,303 | B2 | 3/2018 | Seo et al. |
| 9,980,234 | B2 | 5/2018 | Yang et al. |
| 9,986,562 | B2 | 5/2018 | Zhu et al. |
| 10,536,984 | B2 * | 1/2020 | Song .............. H04L 5/001 |
| 11,665,756 | B2 | 5/2023 | Song et al. |
| 2011/0310759 | A1 | 12/2011 | Gerstenberger et al. |
| 2012/0224652 | A1 | 9/2012 | Chen et al. |
| 2013/0034073 | A1 | 2/2013 | Aiba et al. |
| 2013/0044720 | A1 | 2/2013 | Nakao et al. |
| 2013/0083741 | A1 | 4/2013 | Larsson et al. |
| 2013/0322357 | A1 | 12/2013 | He et al. |
| 2014/0198766 | A1 | 7/2014 | Siomina et al. |
| 2015/0341864 | A1 | 11/2015 | Yang et al. |
| 2016/0360541 | A1 | 12/2016 | Kim et al. |
| 2017/0013621 | A1 | 1/2017 | Thubert et al. |
| 2021/0144785 | A1 | 5/2021 | Song et al. |

FOREIGN PATENT DOCUMENTS

| | | |
|---|---|---|
| CN | 103416015 A | 11/2013 |
| CN | 103581891 A | 2/2014 |
| CN | 104247494 A | 12/2014 |
| EP | 2618628 A1 | 7/2013 |
| JP | 2012065234 A | 3/2012 |
| JP | 2013526088 A | 6/2013 |
| JP | 2013539312 A | 10/2013 |
| JP | 2013542625 A | 11/2013 |
| JP | 2015527810 A | 9/2015 |
| JP | 2016506199 A | 2/2016 |
| JP | 2018504057 A | 2/2018 |
| JP | 6795507 A | 12/2020 |
| RU | 2437235 C2 | 12/2011 |
| RU | 2459357 C2 | 8/2012 |
| WO | 2011122265 A1 | 10/2011 |
| WO | 2011132721 A1 | 10/2011 |
| WO | 2012022096 A1 | 2/2012 |
| WO | 2012024181 A1 | 2/2012 |
| WO | 2013109073 A1 | 7/2013 |
| WO | 2014022032 A1 | 2/2014 |
| WO | 2014107050 A1 | 7/2014 |
| WO | 2016120461 A1 | 8/2016 |

OTHER PUBLICATIONS

Huawei, "PUCCH design for carrier aggregation", 3GPP TSG RAN WG1 Meeting #58bis, Miyazaki, Japan, Oct. 12-16, 2009, pp. 1-6, R1-093838.

Ericsson et al., "Multi-cell periodic CSI transmission", 3GPP TSG-RAN WG1 #69, Prague, Czech Republic, May 21-25, 2012, pp. 1-4, R1-121986.

New Postcom, "Multi-cell HARQ-ACK and periodic CSI multiplexing issues on uplink control signalling enhancement", 3GPP TSG RAN WG1 Meeting #69, Prague, Czech Republic, May 21-25, 2012, pp. 1-6, R1-122093.

* cited by examiner

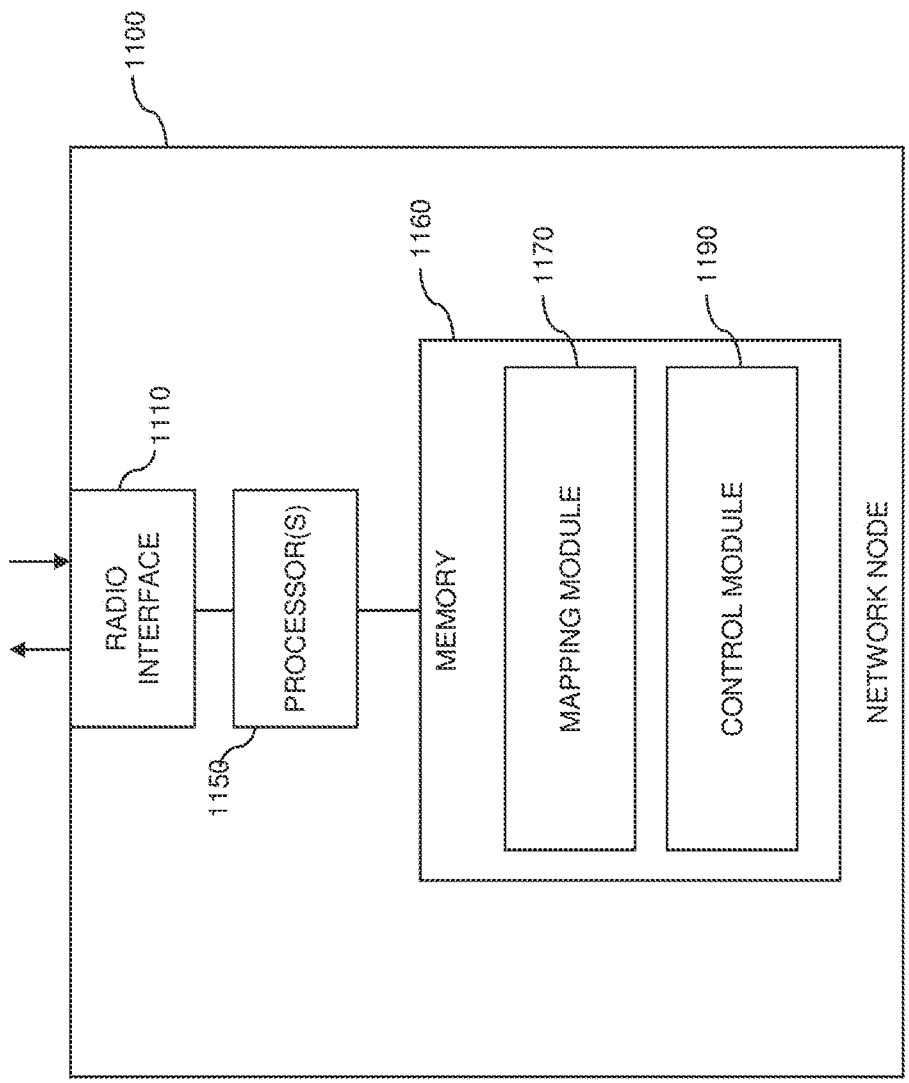

COMMUNICATING CONTROL DATA IN A WIRELESS COMMUNICATION NETWORK

RELATED APPLICATIONS

The present application is a continuation of U.S. patent application Ser. No. 17/155,910, filed on Jan. 22, 2021, now U.S. Pat. No. 11,665,756, which is a continuation of patent application Ser. No. 16/716,882, filed on Dec. 17, 2019, now U.S. Pat. No. 10,904,934, which is a continuation of U.S. patent application Ser. No. 15/544,296, filed on Jul. 18, 2017, now U.S. Pat. No. 10,536,984, which is a national stage application of PCT/EP2016/051964, filed on Jan. 29, 2016, which further claims foreign priority to PCT/CN2015/071894, filed on Jan. 30, 2015, the disclosures of each of which are incorporated herein by reference in their entirety.

TECHNICAL FIELD

The present invention relates to methods for sending or receiving control data in one or multiple uplink control channel resources of a wireless communication network and to corresponding devices.

BACKGROUND

In the field of wireless communication, the terms "User Equipment, UE" and "wireless device" are commonly used for various communication entities e.g., including mobile telephones, tablets and laptop computers. In this disclosure, "wireless device" will be used to represent any wireless communication entity capable of communicating radio signals with a wireless network. It should be noted that a wireless device in this context may also be a Machine Type Communication, MTC, device such as a sensor, counter or measuring device arranged to operate automatically and send reports or other messages to some central node.

Further, the term "network node" represents any node of a wireless network that is arranged to communicate radio signals with wireless devices. Throughout this disclosure, the term network node is interchangeable with base station, transmission point, radio node, eNodeB or eNB, and the term wireless device is interchangeable with UE. In a typical cellular network, which is an example of a wireless communication network, User Equipments (UEs), communicate via a Radio Access Network (RAN) to one or more Core Networks (CNs).

For example, the LTE (Long Term Evolution) radio technology specified by 3GPP ($3^{rd}$ Generation Partnership Project) uses Orthogonal Frequency Division Multiplexing (OFDM) for downlink (DL) transmissions to UEs and Discrete Fourier Transform (DFT) spread OFDM, also referred to as Single Carrier (SC) OFDM, for uplink (UL) transmissions from the UEs. In this case, the available resources may be organized in a time-frequency grid of subcarriers with 15 kHz width and time elements corresponding to the duration of one OFDM symbol. A resource element may then extend over one subcarrier in the frequency domain and the duration of one OFDM symbol in the time domain. Such a time-frequency grid may be defined individually for each antenna port.

In the time domain, LTE DL transmissions are organized in radio frames of 10 ms duration, each radio frame consisting of ten equally-sized subframes of 1 ms duration, also referred to as TTI (Transmission Time Interval). The subframes are in turn divided into two slots, each having 0.5 ms duration. Each subframe includes a number of OFDM symbols which may be used for conveying control information or data.

The resource allocation in LTE is accomplished on the basis of resource blocks. A resource block corresponds to one slot in the time domain and 12 contiguous subcarriers in the frequency domain. In LTE, the highest granularity level of assigning resource elements corresponds to two in time consecutive resource blocks, also referred to as a resource block pair or Physical Resource Block (PRB). A PRB thus extends over the entire time duration of the subframe.

The use of LTE carrier aggregation (CA), introduced in LTE Rel-10 and enhanced in Rel-11, offers means to increase the peak data rates, system capacity and user experience by aggregating radio resources from multiple carriers that may reside in the same band or different bands and, for the case of inter-band TDD CA, may be configured with different UL/DL configurations. In Rel-12, carrier aggregation between TDD and FDD serving cells is introduced to support UE connecting to them simultaneously.

In Rel-13, LAA (Licensed-Assisted Access) has attracted a lot of interest in extending the LTE carrier aggregation feature towards capturing the spectrum opportunities of unlicensed spectrum in the 5 GHz band. WLAN operating in the 5 GHz band nowadays already supports 80 MHz in the field and 160 MHz is to follow in Wave 2 deployment of IEEE 802.11ac. There are also other frequency bands, such as 3.5 GHZ, where aggregation of more than one carrier on the same band is possible, in addition to the bands already widely in use for LTE. Enabling the utilization of at least similar bandwidths for LTE in combination with LAA as IEEE 802.11ac Wave 2 will support calls for extending the carrier aggregation framework to support more than 5 carriers. The extension of the CA framework beyond 5 carriers was approved to be one work item for LTE Rel-13. The objective is to support up to 32 carriers in both UL and DL.

Compared to single-carrier operation, a UE operating with CA has to report feedback for more than one DL component carriers. Meanwhile, a UE may have different capabilities in aggregating carriers in the UL and the DL. One special case is that a UE does not need to support DL and UL CA simultaneously. For instance, the first release of CA capable UEs in the market only supports DL CA but not UL CA. This is also the underlying assumption in the 3GPP RAN4 standardization. Therefore, an enhanced UL control channel, i.e., Physical Uplink Control Channel, PUCCH, format 3 was introduced for CA in Rel-10.

Channel-state information (CSI) is used to provide the eNB with an estimate of the channel properties as seen from the terminal to aid channel-dependent scheduling. Two kinds of CSI reporting modes are supported in LTE: periodic CSI reporting and aperiodic CSI reporting. Periodic CSI can be transmitted either on PUCCH or PUSCH (Physical Uplink Shared Channel) while aperiodic CSI can only be transmitted on PUSCH. Periodic CSI consists of rank indicator (RI), wideband/sub-band PM and wideband/sub-band CQI and is reported in a periodic manner. In carrier aggregation, periodic CSI is reported for each component carrier. When periodic CSI reporting for different component carriers collide, the one with highest priority will be reported and the others will be dropped.

Periodic CSI reporting and HARQ-ACK feedback (HARQ: Hybrid Automatic Repeat Request) may occur in the same subframe. Simultaneous transmission of periodic CSI and HARQ-ACK is allowed using format 2a/b if there is only 1 or 2 bits HARQ-ACK. When there are more HARQ-ACK bits, multiplexing of the two is treated differently in different releases.

In Rel-10, multi-cell HARQ-ACK via PUCCH Format 3 or PUCCH Format 1b with channel selection was introduced. When periodic CSI is to be reported in a subframe where multi-cell HARQ-ACK feedback is to be transmitted, periodic CSI report will be dropped, which reduces link adaptation accuracy and user throughput.

In Rel-11, periodic CSI and multi-cell HARQ-ACK (including SR) can be transmitted together via PUCCH Format 3. However, the periodic CSI for only one serving cell can be reported and others will be dropped. The basic principle of transmission of HARQ-ACK together with a single periodic CSI report is that periodic CSI use the remaining bits after HARQ-ACK feedback bits (including SR) has been assigned. The serving cell for periodic CSI reporting is selected according to the Rel-10 priority rule. This is further discussed with respect to FIG. 4.

In view of the above, there is a need for concepts with which control data, particularly control data of different types, are communicated efficiently between nodes of a wireless communication network, such as network nodes (e.g., eNBs) and wireless devices (e.g., UEs). There is also a need to provide concepts to efficiently support an increasing number of component carriers.

SUMMARY

According to an embodiment of the invention a method of sending control data in one or multiple uplink control channel resources of a wireless communication network is provided. A wireless device receives, from a network node, information on a set of downlink component carriers configured for the wireless device. The wireless device receives, from a network node, an indication of the one or multiple uplink control channel resources. The wireless device maps first control data comprising control data for the set of configured downlink component carriers to a part of the one or multiple uplink control channel resources. And the wireless device maps second control data to a remaining part of the one or multiple uplink control channel resources.

According to a further embodiment of the invention a method of receiving control data in one or multiple uplink control channel resources of a wireless communication network is provided. A network node sends to a wireless device information on a set of downlink component carriers configured for the wireless device. The network node sends to the wireless device an indication of the one or multiple uplink control channel resources. The network node maps first control data comprising control data for the set of configured downlink component carriers to a part of the one or multiple uplink control channel resources. And the network node maps second control data to a remaining part of the one or multiple uplink control channel resources.

According to a further embodiment of the invention a wireless device for sending control data in one or multiple uplink control channel resources of a wireless communication network is provided. The wireless device comprises an interface and at least one processor. The at least one processor is configured to: receive, from a network node, information on a set of downlink component carriers configured for the wireless device; receive, from a network node, an indication of the one or multiple uplink control channel resources; map first control data comprising control data for the set of configured downlink component carriers to a part of the one or multiple uplink control channel resources; and map second control data to a remaining part of the one or multiple uplink control channel resources.

According to a further embodiment of the invention a network node for receiving control data in one or multiple uplink control channel resources of a wireless communication network is provided. The network node comprises an interface and at least one processor. The at least one processor is configured to: send to a wireless device information on a set of downlink component carriers configured for the wireless device; send to the wireless device an indication of the one or multiple uplink control channel resources; map first control data comprising control data for the set of configured downlink component carriers to a part of the one or multiple uplink control channel resources; and map second control data to a remaining part of the one or multiple uplink control channel resources.

According to a further embodiment of the invention a computer program or a computer program product is provided, which comprises program code to be executed by at least one processor of a wireless device for sending control data in one or multiple uplink control channel resources of a wireless communication network device, wherein execution of the program code causes the at least one processor to perform steps of the method of sending control data.

According to a further embodiment of the invention a computer program or a computer program product is provided, which comprises program code to be executed by at least one processor of a network node for receiving control data in one or multiple uplink control channel resources of a wireless communication network, wherein execution of the program code causes the at least one processor to perform steps of the method of receiving control data.

Details of such embodiments and further embodiments will be apparent from the following detailed description of embodiments.

BRIEF DESCRIPTION OF DRAWINGS

FIG. 11 schematically illustrates exemplary structures of a network node such as a base station according to an embodiment of the invention.

DETAILED DESCRIPTION

In the following, concepts in accordance with exemplary embodiments of the invention will be explained in further detail and with reference to the accompanying drawings. The illustrated embodiments relate to concepts for sending or receiving control data in one or multiple uplink control channel resources of a wireless communication network. In the illustrated embodiments, the wireless communication network is assumed to be a cellular network, e.g., based on LTE radio access technology. However, it should be understood that the concepts could also be applied in connection with other radio access technologies, e.g., Universal Mobile Telecommunications System (UMTS) radio access technology. Further, the illustrated concepts may also be applied in other kinds of wireless communication networks, e.g., in WLANs.

The illustrated functionality is assumed to be implemented by a wireless device such as a UE and/or network node such as an access node or base station of the wireless communication network.

Figure 1:
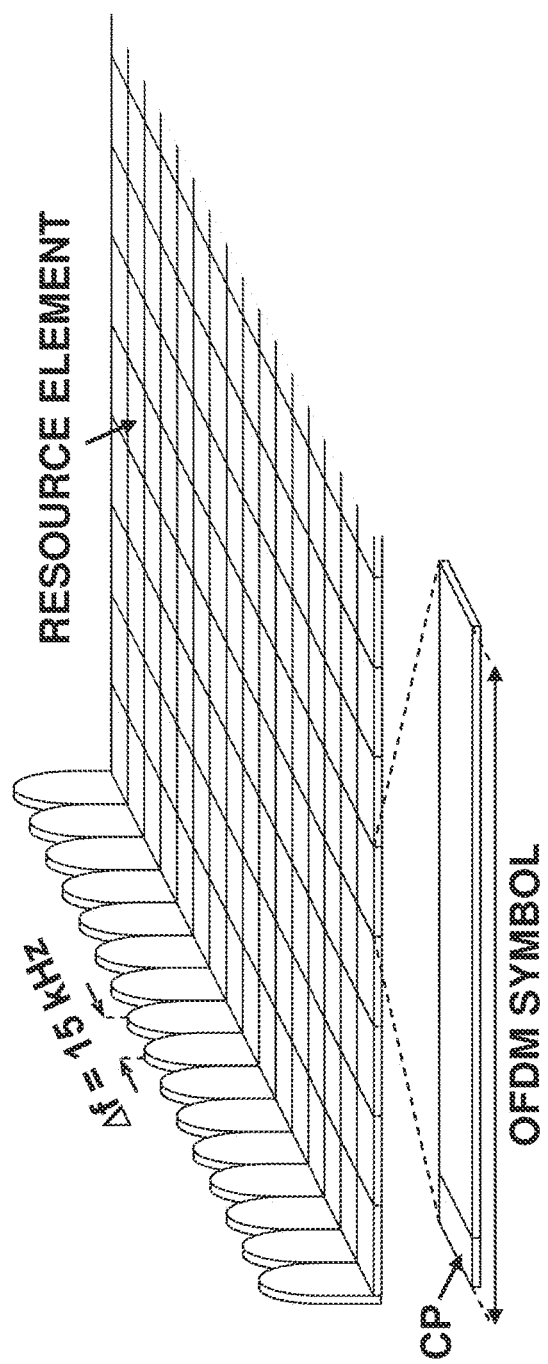
FIG. 1 schematically illustrates a subframe organized in a time-frequency grid as used in an embodiment of the invention.

FIG. 1 schematically illustrates the time-frequency grid. As illustrated, the time-frequency grid comprises a plurality of resource elements which correspond to one subcarrier of 15 kHz width in the frequency domain and a time slot having the duration of one OFDM symbol. As further illustrated, the OFDM symbols may each include a cyclic prefix (CP). In the following explanations, the OFDM symbols are assumed to be designated by an index s=0, 1, 2, . . . which increases with the time domain position of the OFDM symbol. In other radio technologies, a different time-frequency grid could be used, e.g., using another width of the subcarriers. Further, also other multiplexing schemes than OFDM could be utilized.

Figure 2:
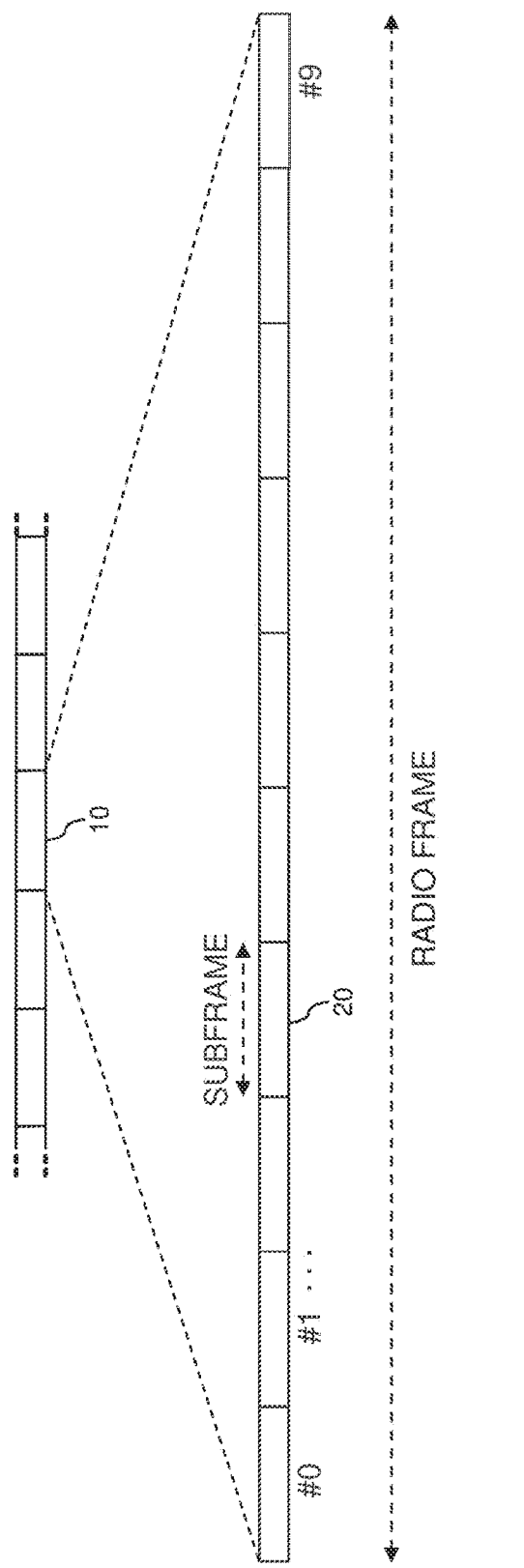
FIG. 2 schematically illustrates a radio frame comprising a sequence of subframes as used in an embodiment of the invention.

The time-domain structure of DL transmissions over the radio interface is illustrated in FIG. 2. As illustrated, the DL transmissions are organized in a sequence of radio frames 10 which each include a number of subframes 20. In accordance with the LTE specifications, it is assumed that the duration of a radio frame 10 is 10 ms and the duration of a subframe is 1 ms, which means that the radio frames 10 each consist of ten subframes. In other radio technologies, the time-domain structure of transmissions may be organized in a different manner, e.g., using different durations of the radio frame 10 and/or of the subframes 20.

Figure 3:
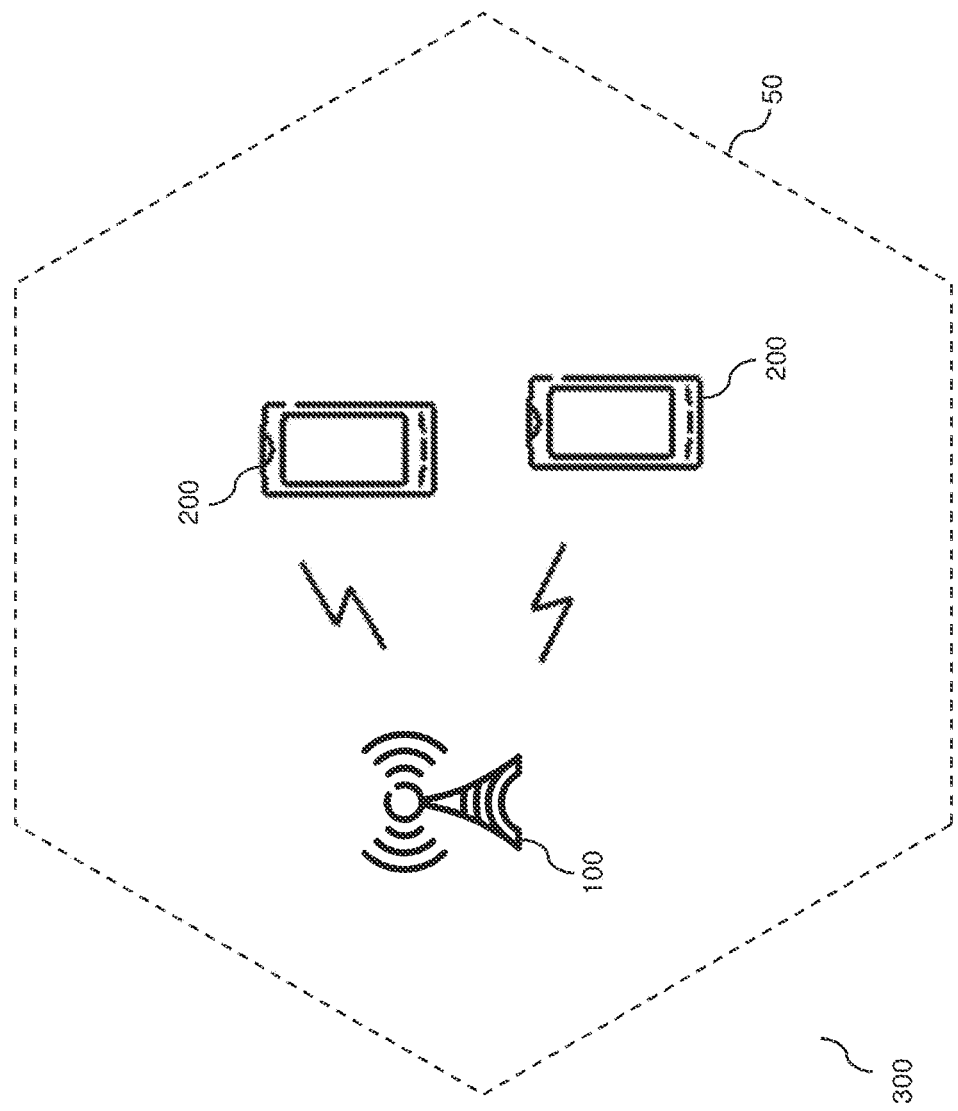
FIG. 3 schematically illustrates a cellular network environment for implementing data transmission according to an embodiment of the invention.

FIG. 3 illustrates an exemplary cellular network environment in which the concepts may be applied. Specifically, a cell 50 of the cellular network 300 is illustrated which is served by a base station 100. Using the terminology as established for the LTE radio technology, the base station 100 may also be referred to as "evolved Node B" (eNB). In the cell 50, a plurality of UEs 200 may be served. For this purpose, the resource elements in the subframes 20 may be allocated to the individual UEs 200 by a scheduling mechanism, e.g., implemented at the base station 100.

Figure 4:
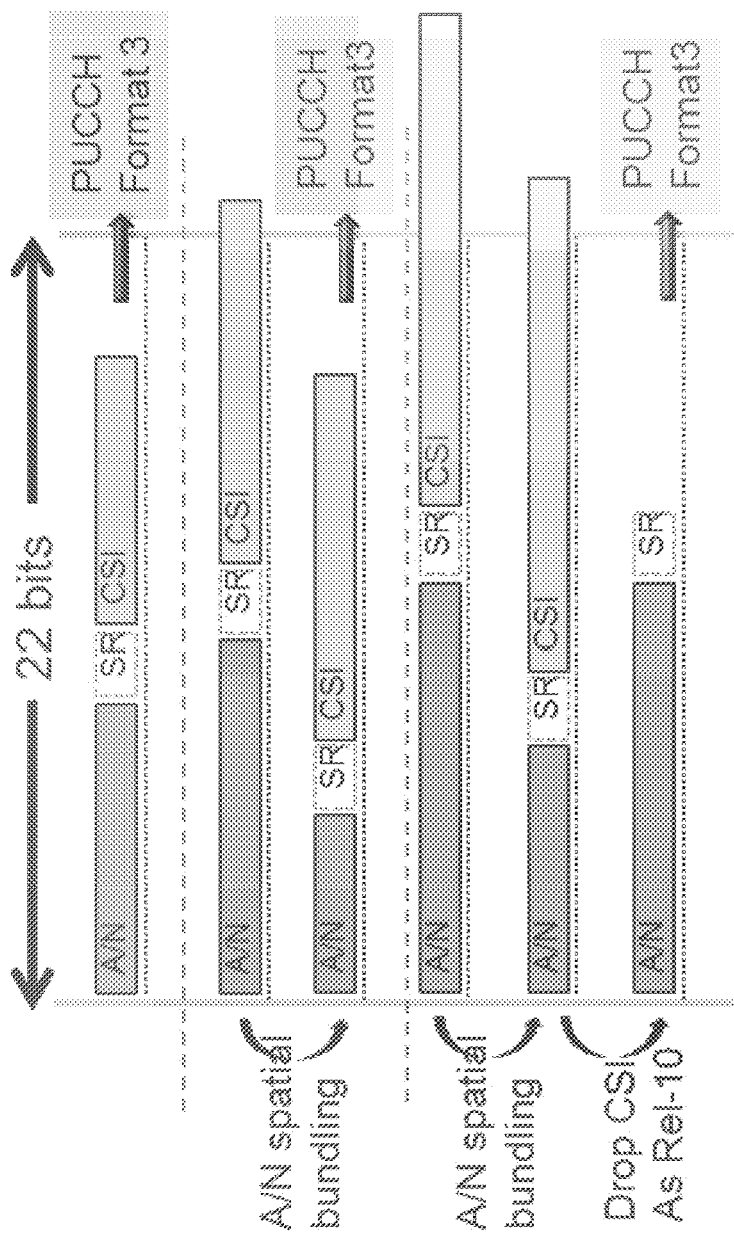
FIG. 4 schematically illustrates a multiplexing of HARQ-ACK bits, SR and periodic CSI on PUCCH format 3.

FIG. 4 schematically illustrates a multiplexing of HARQ-ACK bits, SR and periodic CSI on PUCCH format 3. As shown in FIG. 4, the maximum size of PUCCH format 3 payload is 22 bits. The information bit ordering into the encoder is: HARQ-ACK (referenced in FIG. 4 by A/N), SR, CSI. If the total number of HARQ-ACK, SR and periodic CSI is less than 22 bits, then HARQ-ACK including SR is transmitted together with periodic CSI. If the total number of HARQ-ACK (before spatial bundling) and periodic CSI excess the payload size of PUCCH format 3, spatial domain bundling is applied, i.e., only one HAQR-ACK bit is generated for one component carrier over one subframe by taking a logical AND on the two HARQ-ACK bits from MIMO. If the total information bits of periodic CSI and HARQ-ACK bits (after spatial bundling) is beyond the payload size of PUCCH format 3, periodic CSI is dropped.

In Rel-10/11/12, the maximum number of supported DL component carriers for a single UE is 5. For each DL component carrier, at most 2 Ack/Nack (A/N) bits are needed for one FDD component carrier, and 4 Ack/Nack bits are needed for one TDD component carrier (except for TDD configuration 5). In total, there are 5*4=20 bits for Ack/Nack feedback at most for up to 5 DL component carriers. However, in Rel-13, up to 32 DL carriers need to be supported for a single UE. If the same number of Ack/Nack bits is needed for FDD and TDD, the maximum Ack/Nack feedback bits would be 32*4=128 bits. Note that PUCCH format 3 for TDD has fixed payload size of 22 bits which is not sufficient to support 32 DL CCs. Therefore, UL control channel capacity enhancement is required even only from HARQ-ACK feedback perspective.

One solution for this is to introduce multiple PUCCH(s) on the same or different carriers. However, there is a need for concepts on how to multiplex the HARQ-ACK, SR and periodic CSI bits together on multiple PUCCH(s). On the other hand, multi-cell periodic CSI reporting which was not supported by the previous release becomes attractive considering the larger PUCCH capacity provided by multiple PUCCH(s). As an example, a UE configured with 12 DL FDD CCs needs at most 24 bits HARQ-ACK, which requires 2 PUCCH format 3 resources. However, 2 PUCCH format 3 resources provide 20 (without SR)/19 (with SR) additional bits for P-CSI transmission except the bits for HARQ-ACK.

Figure 5:
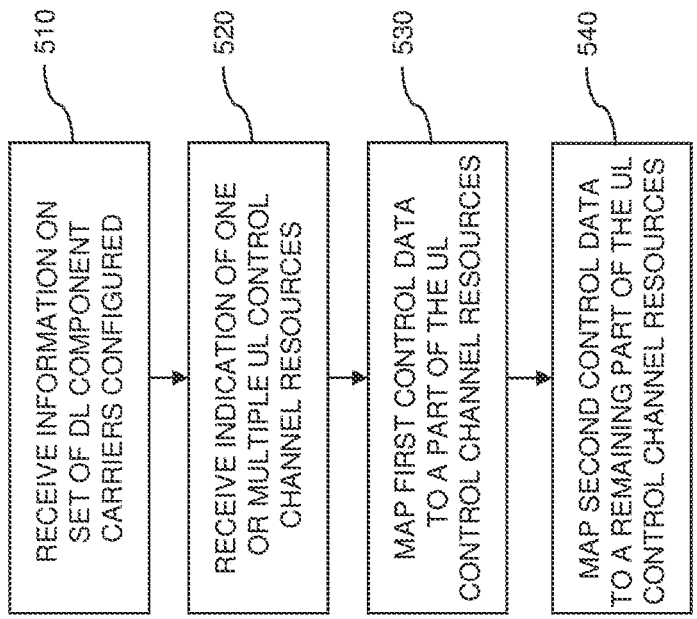
FIG. 5 shows a flowchart for illustrating a method according to an embodiment of the invention, which may be implemented by a wireless device such as a user equipment.

FIG. 5 shows a flowchart for illustrating a method of sending control data in one or multiple uplink control channel resources of a wireless communication network, e.g., a cellular network. The method may be used for implementing concepts described herein in a wireless device, e.g., a user equipment, such as one of the UE 200 in FIG. 3. If a processor based implementation of the wireless device is used, the steps of the method may be performed by one or more processors of the wireless device. For this purpose, the processor(s) may execute correspondingly configured program code. Further, at least some of the corresponding functionalities may be hardwired in the processor(s).

Typically, the uplink control channel resources are within one subframe. One uplink control channel resource may be a set of resource blocks or a set of resource elements of a time-frequency transmission resource in one subframe. An example of a time-frequency transmission resource is the LTE transmission resource comprising resource blocks and resource elements as has been discussed with respect to FIG. 1. An example of an uplink control channel resource is a PUCCH resource, such as a PUCCH resource format 3 or a PUCCH resource of another format as have been mentioned above. Further PUCCH resource formats may be defined e.g., by indicating a set of resource blocks or resource elements in a subframe. Control data may comprise protocol feedback such as HARQ feedback (HARQ ACKs and NACKs). Control data may also comprise scheduling requests. A further type of control data may comprise control data for a set of configured downlink component carriers such as CSI reports, in particular periodic CSI reports.

For example, the wireless communication network comprises a wireless device and a network node. An example of a wireless communication network is depicted in FIG. 3.

At step 510, the wireless device receives, e.g., from a network node, information on a set of downlink component carriers configured for the wireless device. The information may be an indication on which downlink component carriers are configured for the wireless device for carrier aggregation. The term component carrier refers to a carrier that can be aggregated in the context of carrier aggregation. The downlink refers to a link from the network node to the wireless device, e.g., a link from an eNodeB to a UE. The network node may be an eNodeB serving the wireless device.

At step 520, the wireless device receives, e.g., from a network node, an indication of the one or multiple uplink control channel resources. The wireless device may use the uplink control channel resources for sending control data to the network node. Multiple PUCCH resources in one subframe may be indicated to the wireless device. E.g., two different PUCCH resources of format 3 in one subframe may be indicated to the wireless device. So the amount of available PUCCH resources may then be twice as large as compared to indicating only one PUCCH resource in a subframe. The wireless device is generally able to identify the indicated resources on the basis of the received indication.

At step 530, the wireless device maps first control data comprising control data for the set of configured downlink component carriers to a part of the one or multiple uplink control channel resources. First control data may comprise protocol feedback for the configured downlink component carriers such as HARQ feedback. First control data may further comprise scheduling request of the wireless device. A part of the one or multiple control channel resources may be any subset of resource blocks or resource elements assigned to the one or multiple control channel resources. After first control data is mapped to a part of the uplink control channel resources, a remaining part of uplink control channel resources can be determined. Such remaining part comprises spare resources e.g., spare resource blocks or resource elements of the indicated uplink control channel resources that are not used by first control data. The remaining part may be defined by a size or a number of spare resources. In one example the size of the remaining part of the uplink control channel resources is determined. This may be done per uplink control channel resource or in total, i.e., for all indicated uplink control channel resources. Mapping of data to resources in general means assigning data to transmission resources on which the data is intended to be sent or received.

At step 540, the wireless device maps second control data to a remaining part of the one or multiple uplink control channel resources. The second control data are different to the first control data.

Typically, the wireless device sends the first control data and the second control data according to the mapping to a network node of the wireless communication network.

The second control data may comprise one or multiple reports. Typically, each report is associated with or relates to one downlink component carrier of the set of configured downlink component carriers. Examples of such reports are CSI reports, in particular periodic CSI reports. Such reports may indicate a channel state information for a related component carrier. The remaining part refers to the part of the indicated uplink channel resource to which no first control data is mapped.

In one example, at maximum one report is mapped to an uplink control channel resource. In other words, in this example, not more than one report is mapped per uplink control channel resource.

In another example, one report is mapped to multiple uplink control channel resources. E.g., one report is distributed over two uplink channel resources, e.g., two different PUCCH resources in one subframe.

In a further example, multiple reports are mapped to one uplink control channel resource. E.g., two reports are mapped to one uplink control channel resource.

In an optional step, the wireless device receives, from a network node, an indication of a maximum number of reports to be included in the indicated one or multiple uplink control channel resources. The maximum number may give a restriction to the wireless device on how many reports may be put into the uplink control channel resources. In an embodiment such maximum number may be configured or predefined for the wireless communication network.

In an optional step, the wireless device receives, from a network node, an indication of a maximum number of reports to be included in one of the uplink control channel resource. In one example, each of the uplink control channel resources has the same maximum number. E.g., one report per uplink channel resource is the maximum. In another example, different maximum numbers are assigned to different uplink control channel resources. E.g., two reports are maximum for a first uplink channel resource, one report is maximum for a second uplink channel resource and zero/no reports are foreseen for a third uplink channel resource. In an embodiment such maximum number may be configured or predefined for the wireless communication network.

The second control data may be ordered according to a priority rule and the mapping of the second control data is performed on the basis of this ordering. As the second control data may comprise reports, such as CSI reports, these reports may be ordered according to a priority rule and mapped on the basis thereof. Accordingly reports with higher priority may be mapped, whereas reports with lower priority may be dropped depending e.g., on a given maximum number or the size(s) of the available remaining part(s) of the uplink control channel resources.

An example of a priority rule is that the priority of a report of a licensed downlink component carrier is higher than the priority of a report of an unlicensed downlink component carrier. Another example is that the lower a cell index of a component carrier is the higher is the priority of CSI report of the component carrier. These and further examples of priority rules are discussed below with respect to CSI reports.

Second control data having highest priority, e.g., the report having highest priority, may be mapped to the remaining part of the uplink control channel resource having the largest remaining part. In one example, a report is mapped on the basis of the priority of a report and the size of the remaining part of an uplink control channel resources. Here, report priority and sizes of remaining parts are the basis for the mapping. Following the described concept, a report with higher priority may be mapped to an uplink control channel resource having a larger remaining part, whereas a report with lower priority may be mapped to an uplink control channel resource having a smaller remaining part.

The first control data may comprise protocol feedback, such as HARQ-ACK or HARQ-NACK, for the configured downlink component carriers. First control data may also comprise scheduling request of the wireless device. With the scheduling request the wireless device may request resources from the network node.

In one example, the first control data is mapped such that at least one of the uplink control channel resources is completely filled by first control data. In another example, the first control data is mapped such that first control data is evenly distributed over the indicated one or multiple uplink control channel resources. Here all or a subset of the indicated uplink control channel resources may receive about the same amount of the first control data.

Figure 6:
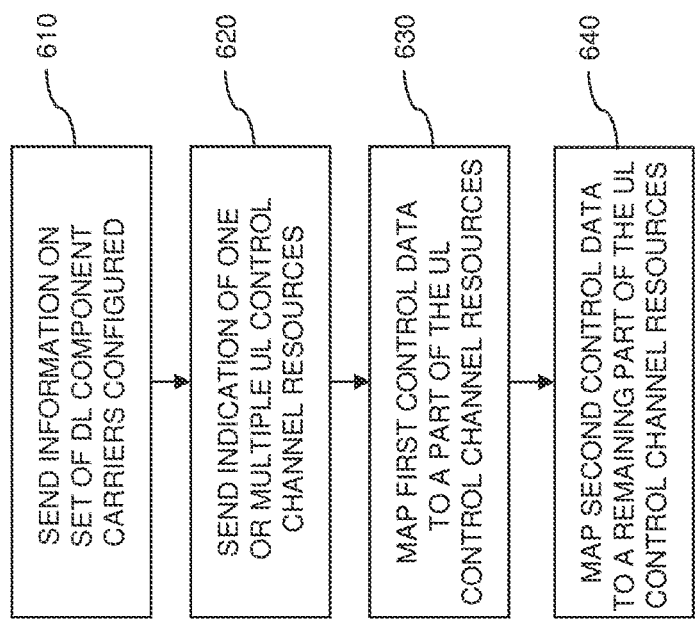
FIG. 6 shows a flowchart for illustrating a method according to an embodiment of the invention, which may be implemented by a network node, such as an access node or a base station of a wireless communication network.

FIG. 6 shows a flowchart for illustrating a method of sending control data in one or multiple uplink control channel resources of a wireless communication network, e.g., a cellular network. The method may be used for implementing the described concepts in a network node, e.g., access node such as the one of the access node 1000. If a processor based implementation of the wireless device is used, the steps of the method may be performed by one or more processors of the wireless device. For this purpose, the processor(s) may execute correspondingly configured program code. Further, at least some of the corresponding functionalities may be hardwired in the processor(s).

FIG. 5 illustrates a method from the perspective of a sender of control data in one or more multiple uplink control channel resources, whereas FIG. 6 illustrates the method from the perspective of a receiver. Concepts described with respect to FIG. 5 have a corresponding counterpart in the method illustrated in FIG. 6.

At step 610, a network node sends, to a wireless device, information on a set of downlink component carriers configured for the wireless device.

At step 620, the network node sends, to the wireless device, an indication of the one or multiple uplink control channel resources.

At step 630, the network node maps first control data comprising control data for the set of configured downlink component carriers to a part of the one or multiple uplink control channel resources.

At step 640, the network node maps second control data to a remaining part of the one or multiple control channel resources.

Further concepts described e.g., with respect to FIG. 5 are also applicable in the context of the method as described with respect to FIG. 6.

Figure 7:
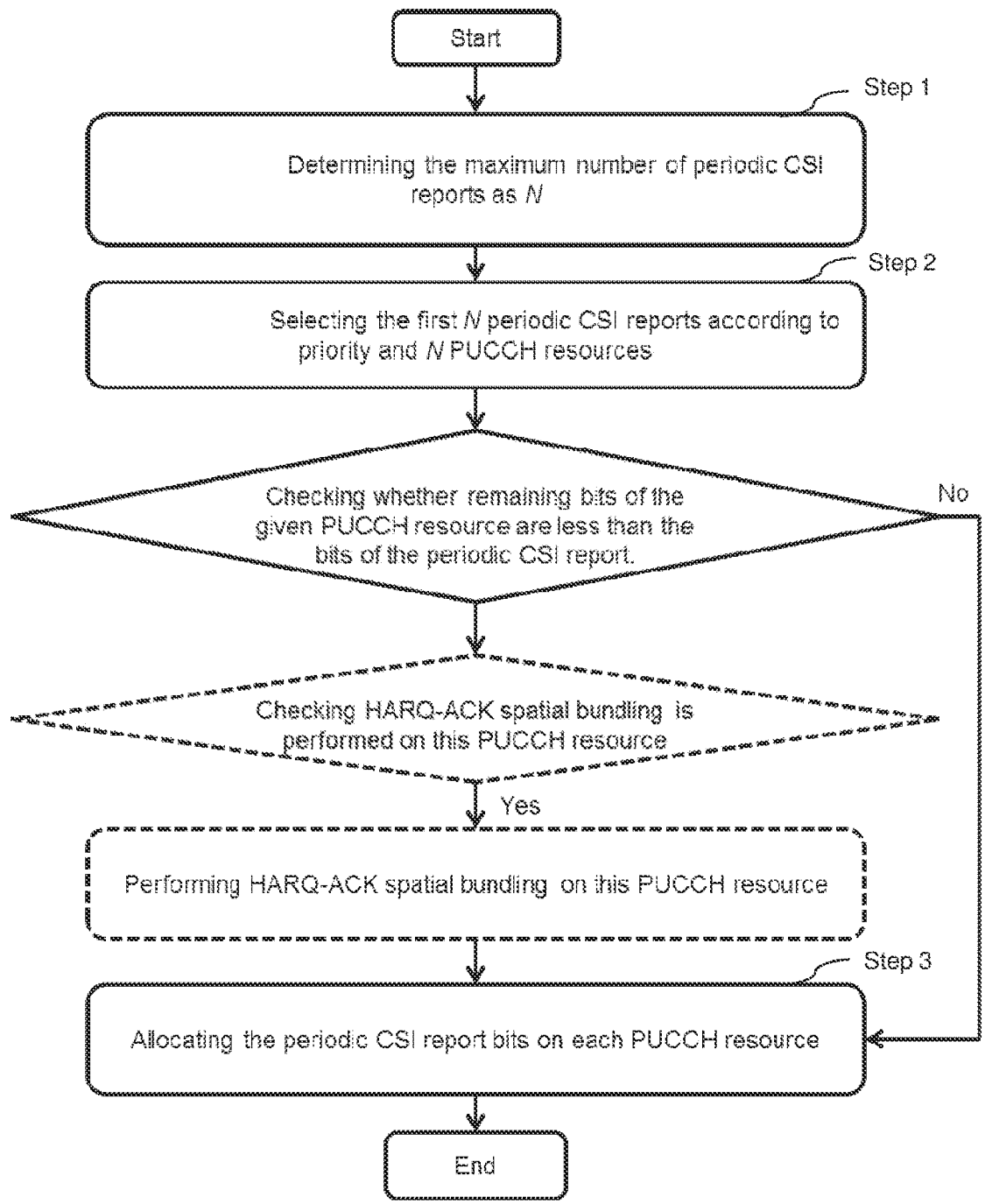
FIG. 7 shows a flowchart for illustration of a specific example of periodic CSI bit allocation on multiple PUCCH resources according to one embodiment of the invention.
Figure 8:
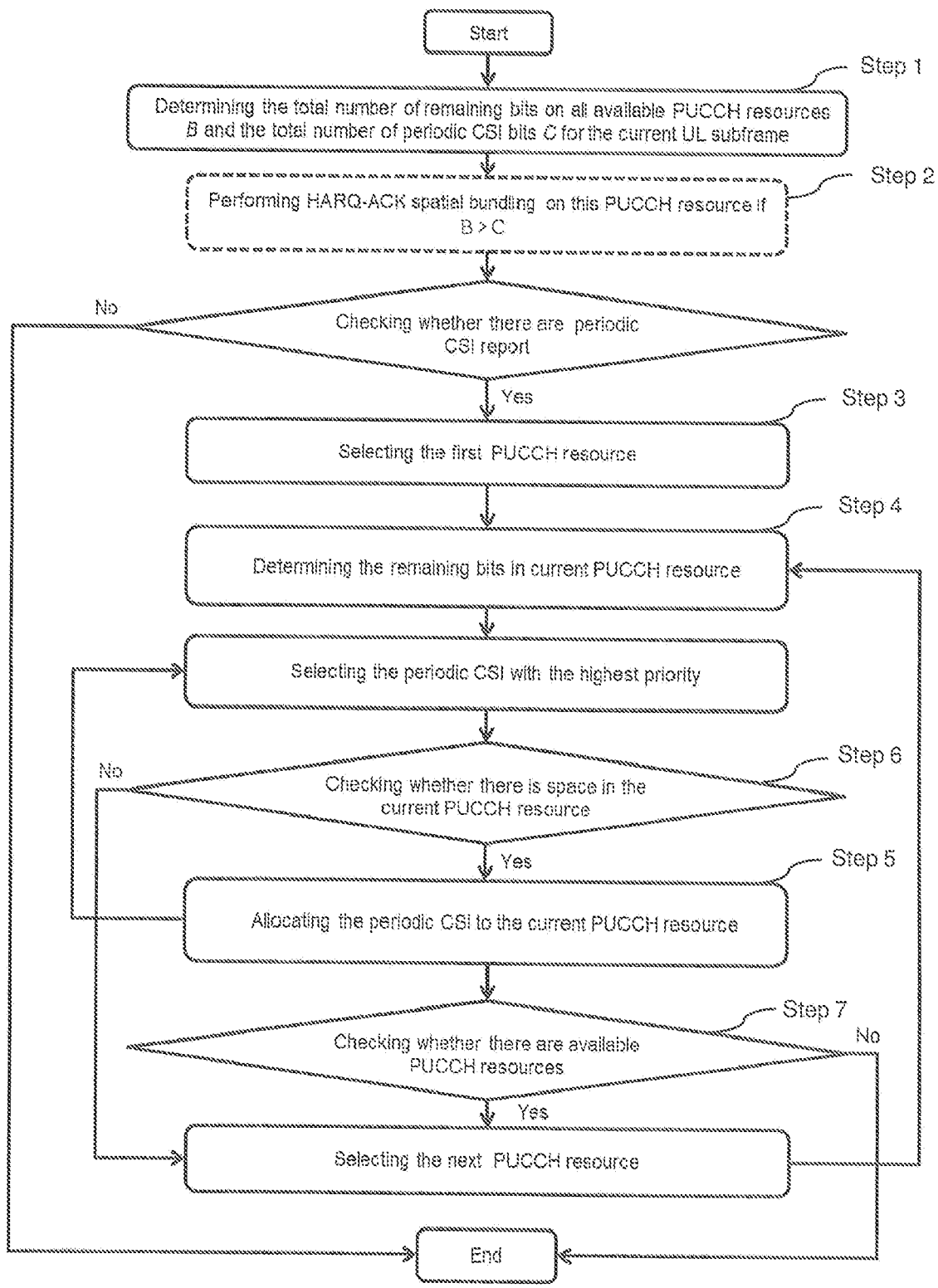
FIG. 8 shows a flowchart for illustration of a further specific example of periodic CSI bit allocation on multiple PUCCH resources according to one embodiment of the invention.
Figure 9:
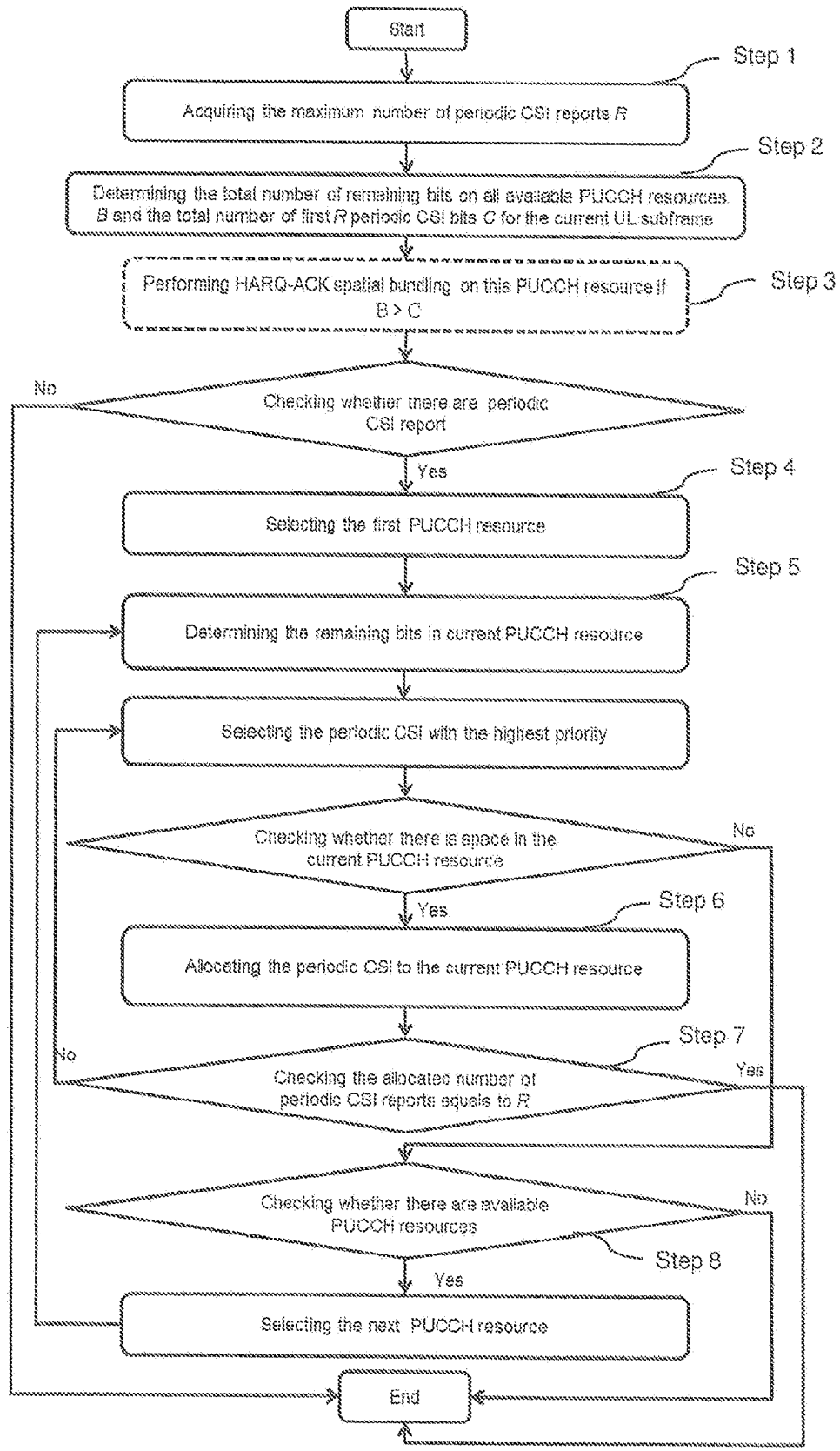
FIG. 9 shows a flowchart for illustration of a still further specific example of periodic CSI bit allocation on multiple PUCCH resources according to one embodiment of the invention.

The described methods and concepts will now be further illustrated by considering specific examples and by referring to FIGS. 7, 8 and 9.

A method for a wireless device to multiplex HARQ-ACK, SR and periodic CSI on multiple PUCCH(s) is provided. The method comprises several steps.

At a first step 1, information of HARQ-ACK and SR bit allocation based on the information of configured downlink component carriers and the PUCCH resources indicated by the eNB is acquired. The wireless device will be configured with a plurality of DL component carriers e.g., to meet DL traffic requirement. Depending on the number of configured DL component carriers, the number of required HARQ-ACK bits in a given UL subframe can be determined. As an example, 2 HARQ-ACK bits are required for a FDD component carrier if this carrier is configured with a transmission mode that supports two transport blocks while 4 HARQ-ACK bits are required for a TDD component carrier if the number of associated DL subframes is 4. For a given UL subframe, the total number of required HARQ-ACK bits can be obtained by summing up the number of required HARQ-ACK bits on all configured DL component carriers. Besides, the wireless device may be configured with a periodic SR resource based on the delay requirement of the traffic and the system load. In addition, the wireless device may be configured with periodic CSI reporting for each of the DL component carriers. The configurations may include the periodicity, time offset and the mode for the reporting. So, for a given subframe, the total number of UL control information (UCI) bits including HARQ-ACK, SR and the periodic CSI can be determined by summing up the three together. HARQ-ACK and SR are examples of first control data, whereas the periodic CSI is an example of second control data.

To meet the requirement of UCI transmission, the eNB may allocate one or a plurality of PUCCH resources to the wireless device. The PUCCH resources may be indicated by a DL scheduling assignment via (E) PDCCH. Here, the total of allocated PUCCH resource is denoted as N.

Based on the total number of HARQ-ACK and SR together with the available PUCCH resources, a certain bit mapping rule shall be applied in order to fit CSI bits into the available PUCCH resources. Different mapping rules can be applied. One example is to fill up the PUCCH resource one by one, i.e., first allocate the HARQ-ACK and SR bits into a first PUCCH resource until there is no more space, then allocate the remaining bits to the second PUCCH resource and so forth. Another example is to distribute the HARQ-ACK and SR bits on the PUCCH resources in an equal manner.

In one example, it may be predefined or configured that the CSI report of one DL CC (Downlink Component Carrier) shall be carried by a single PUCCH channel.

In a further example, the CSI report of one DL CC can be carried by up to 2 or even more PUCCH channel resources. Here, the CQI, RI and PMI fields may be carried by different PUCCH channels, but the CQI (or RI, PMI) bits of one DL CC shall not be divided between two PUCCH channels.

In a still further example, the CSI bits of all selected DL CCs are aggregated sequentially and divided across the PUCCH channels according to the available bits after HARQ ACK/NACK and SR mapping.

At a second step, the remaining bits on each of the PUCCH resources are determined e.g., by subtracting the total bits of HARQ-ACK and SR.

Based on a mapping of HARQ-ACK and SR bits at step 1, the remaining space ($K_{CSI,i}$) for PUCCH resource i can be obtained by subtracting the bits of HARQ-ACK and SR (($K_{HARQ-SR,i}$)) from the capacity of each PUCCH resource ($K_i$), i.e., $K_{CSI,i}=K_i-K_{HARQ-SR,i}$. This step may be performed for each PUCCH resource. Depending on particular bit mapping rules, the remaining bits on each PUCCH resource may be different.

At a third step, periodic CSI reports with the highest priority can be mapped to the PUCCH resource with the largest remaining number of bits after HARQ-ACK and SR.

One or multiple of the examples may be applied to prioritize the CSI reporting: It can be predefined or configured that the CSI report of licensed DL carriers is higher than unlicensed DL carriers; It can be predefined or configured that the CSI report of the carrier with lower cell index is of high priority; it can be predefined or configured that the CSI report of DL scheduling carriers are of higher priority than other DL carriers when cross-carrier scheduling is applied; and/or it can be predefined or configured that the CSI report of DL CCs in certain frequency band are of higher priority than the DL CCs in another band.

At a fourth step, the above three steps may be Iterated until there is no spare space in any of the PUCCH resources for the remaining periodic CSI report with the highest priority or the number of reported periodic CSI has reached a preconfigured value.

At the discussed third and fourth step, periodic CSI reports are allocated to available PUCCH resources. If there are multiple periodic CSI reports for different carriers or different CSI processes that collide in the same UL subframe, some priority rules shall be applied. As an example, the priority rules as used LTE Rel-12 may be applied. According to some priority rules, for a given subframe, the CSI report for some PUCCH reporting types have higher priority than the other PUCCH reporting types. For the same reporting types, the one with the lowest serving cell index or lowest CSI process identifier shall have the highest priority.

After applying such priority rules, the periodic CSI reports are ordered from high to low. Here, $L_{P1}$ denotes a number of bits for the periodic CSI with the highest priority and M denotes a total number of periodic CSI that needs to be reported in this UL subframe.

Several options of mapping the periodic CSI to the N available PUCCH resources as e.g., discussed with respect to the third and fourth step are described in the following.

In a first option, which is also illustrated in further detail in FIG. 7, at most one CSI report over one PUCCH channel is allowed. The bit mapping for periodic CSI can be done as follows:

Step 1: Determining the maximum number of periodic CSI reports as N, i.e., same to the number of PUCCH resources.

Step 2: Selecting the first N periodic CSI reports according to priority and N PUCCH resources. The selection of the PUCCH resources can e.g., be done according to remaining bits of PUCCH resources, i.e., the periodic CSI with the highest priority is mapped to the PUCCH resource with the largest number of remaining bits, or in an arbitrary order.

Step 3: Allocating the periodic CSI report on each PUCCH resource, i.e., the periodic CSI bits are mapped after the HARQ-ACK and SR (if present). Optionally, spatial bundling is performed in this step if the remaining bits on the given PUCCH resource are less than the bits of the periodic CSI report.

In a second option, which is also illustrated in further detail in FIG. 8, one or multiple periodic CSI reports can be mapped in one PUCCH resource according to the available bits for CSI reporting over this PUCCH resource. The bit allocation for periodic CSI can be done as follows:

Step 1: Determining the total number of remaining bits on all available PUCCH resources denoted as B by summing up all the spare bits in all PUCCH resources and the total number of periodic CSI bits for the current UL subframe denoted as C.

Step 2: If B>C, go to Step 3, otherwise HARQ-ACK spatial bundling is applied on the first PUCCH resources and go to Step 1. The first PUCCH resource can e.g., be the one with the largest spare bits or any of the PUCCH resources. If HARQ-ACK spatial bundling is already applied current PUCCH resource, apply HARQ-ACK spatial bundling to the next PUCCH resource and go to Step 1 until HARQ-ACK spatial bundling is applied on all the PUCCH resources. Note that HARQ-ACK spatial bundling is optional in this step. If it is not applied, go to Step 3 directly.

Step 3: Selecting a first PUCCH resource for period CSI allocation. In case the first PUCCH resource is full, select the next PUCCH resource which has the largest remaining bits or any of the remaining PUCCH resources.

Step 4: Determining the total number of remaining bits of the current PUCCH resource.

Step 5: Allocating the periodic CSI reports in an increasing order of priority, i.e., select the one with the highest priority and allocate the bits into the selected PUCCH resource. There is a possibility that the periodic CSI report may not fit into the remaining bits of current PUCCH resource. In this case, one can split the bits into different PUCCH resources or stop allocating the CSI bits into the current PUCCH resource and go to the next PUCCH resource.

Step 6: Checking whether there are available periodic CSI reports and iterating step 5 until there is no space in the current PUCCH resource.

Step 7: Checking whether there are available PUCCH resources and if so, select the next PUCCH resource go to step 3, otherwise end the bit allocation.

In a third option, which is also illustrated in further detail in FIG. 9, one or multiple periodic CSI reports can be mapped in one PUCCH typically according to the available bits for CSI reporting over this PUCCH. Besides, the maximum reported number of periodic CSI may be configured e.g., by RRC. The bit mapping for periodic CSI can be done as follows:

Step 1: Acquiring the maximum number of periodic CSI reports R configured by the eNB. Note that the number of periodic CSI reports occurring in the same UL subframe denoted as S may be less than R. The number of periodic CSI reports selected for reporting is R'=min {R, S}.

Step 2: Determining the total number of remaining bits on all available PUCCH resources denoted as B by summing up all the spare bits in all PUCCH resources and the total number of first R' periodic CSI bits for the current UL subframe denoted as C.

Step 3: If B>C, go to Step 4, otherwise HARQ-ACK spatial bundling is applied on the first PUCCH resources and go to Step 2. The first PUCCH resource can be either the one with the largest spare bits or any of the PUCCH resources. If HARQ-ACK spatial bundling is already applied current PUCCH resource, apply HARQ-ACK spatial bundling to the next PUCCH resource and go to Step 2 until HARQ-ACK spatial bundling is applied on all PUCCH resources. Note that HARQ-ACK spatial bundling is optional in this step. If it is not applied one can go to step 3 directly.

Step 4: Selecting a first PUCCH resource for period CSI allocation. The first PUCCH resource can be either the one with the largest spare bits or any of the PUCCH resources. In case the first PUCCH resource is full, select the next PUCCH resource which has the largest remaining bits or any of the remaining PUCCH resources.

Step 5: Determining the total number of remaining bits of the current PUCCH resource.

Step 6: Allocating the periodic CSI reports in an increasing order of priority, i.e., select the one with the highest priority and allocate the bits into a first PUCCH resource. Note that there is a possibility that the periodic CSI report may not fit into the remaining bits of one PUCCH resource. In this case, one can either split the bits into different PUCCH resources or stop allocating the CSI bits into the first PUCCH resource and go to the next PUCCH resource.

Step 7: Checking the allocated number of periodic CSI reports r. If r<R', iterate step 6 until there is no space in the current PUCCH resource, otherwise end the bit allocation.

Step 8: Checking whether there are available PUCCH resources and if so, select the next PUCCH resource go to step 3, otherwise end the bit allocation.

Figure 10:
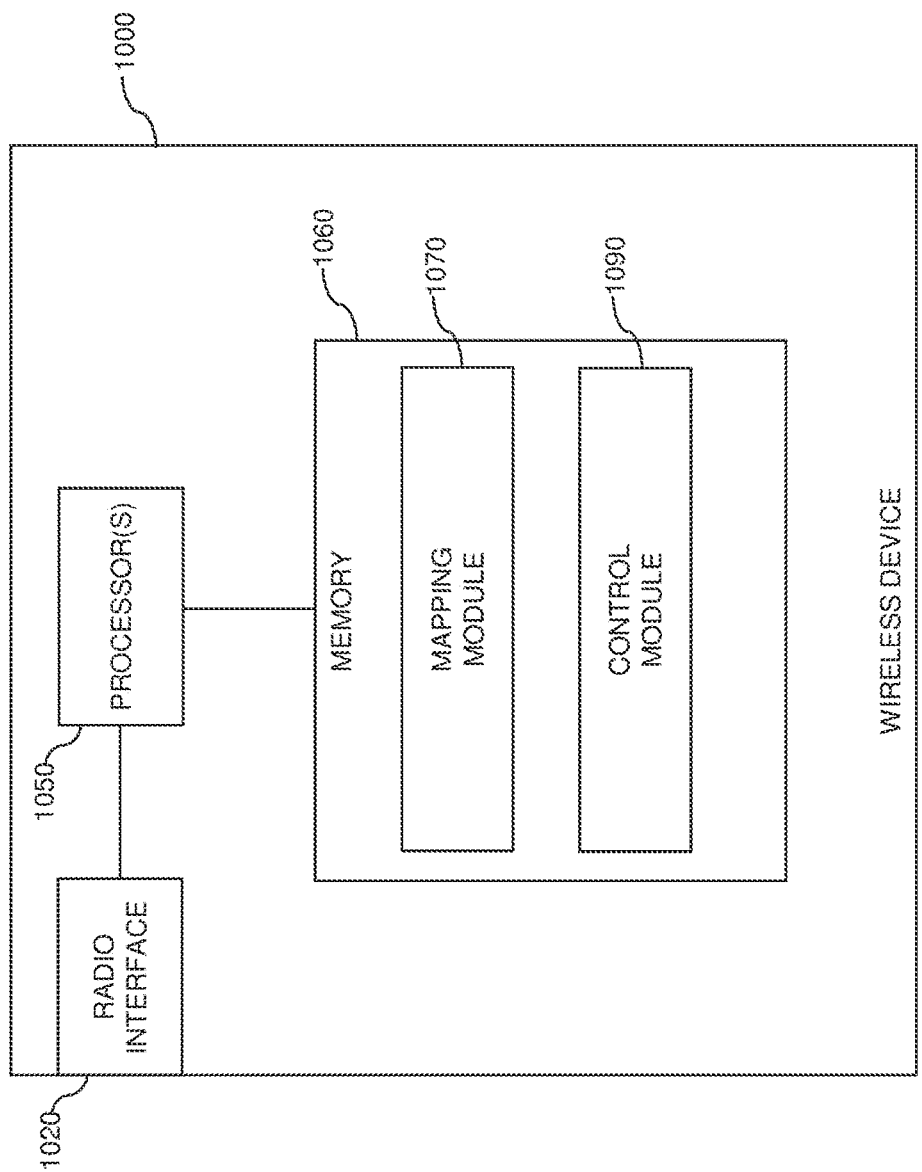
FIG. 10 schematically illustrates exemplary structures of a wireless device such as a UE according to an embodiment of the invention.

FIG. 10 schematically illustrates a wireless device 1000 for a processor based implementation. The device 1000 of FIG. 10 may for example correspond to one of the UEs 10 of FIG. 1.

In the illustrated example, the device includes a radio interface 1020. The radio interface 1020 is configured to support receiving of information on a set of downlink component carriers and an indication of one or multiple uplink control channel resources. The radio interface 1020 may further be configured to support sending of control data.

Further, the device includes one or more processor(s) 1050 coupled to the interface 1020 and a memory 1060 coupled to the processor 1050. The memory 1060 may include a ROM, e.g., a flash ROM, a RAM, e.g., a DRAM or SRAM, a mass storage, e.g., a hard disk or solid state disk, or the like. The memory 1060 includes suitably configured program code modules to be executed by the processor(s) 1050 so as to implement the above-described functionalities of the wireless device, e.g., corresponding to the method steps of FIG. 5. So, the program code modules in the memory 1060 may include a mapping module 1070 so as to implement the above-described functionalities of mapping control data to one or multiple uplink control channel resources. Further, the program code modules in the memory 1060 may also include a control module 1090 so as to implement general control functionalities, such as controlling the interface 1020, sending data to a network node such as an access node, receiving data from a network node, or the like.

It is to be understood that the structure as illustrated in FIG. 10 is merely schematic and that the device may actually include further components which, for the sake of clarity, have not been illustrated, e.g., further interfaces. Also, it is to be understood that the memory 1060 may include further types of program code modules, which have not been illustrated, e.g., program code modules for implementing known functionalities of a wireless device such as a UE. In some implementations, also a computer program may be provided for implementing functionalities of the wireless device, e.g., in the form of tangible product such as a non-transitory medium storing one or more of the program code modules to be stored in the memory 1060 or by making one or more of the program code modules available for download.

FIG. 11 illustrates exemplary structures which may be used for implementing the above concepts in a network node 1100 of a wireless communication network, e.g., an access node such as the base stations 100 in FIG. 1.

As illustrated, the network node 1100 may include a radio interface 1110 for communication with wireless devices, such as the UEs 10.

Further, the network node 1100 includes one or more processors 1150 coupled to the radio interface 1110, and a memory 1160 coupled to the processor(s) 1150. The memory 1160 may include a Read Only Memory (ROM), e.g., a flash ROM, a Random Access Memory (RAM), e.g., a Dynamic RAM (DRAM) or Static RAM (SRAM), a mass storage, e.g., a hard disk or solid state disk, or the like. The memory 1160 includes suitably configured program code to be executed by the processor(s) 1150 so as to implement the above-described functionalities of the network node. In particular, the memory 1160 may include various program code modules for causing the network node to perform processes as described above, e.g., corresponding to the method steps of FIG. 6. As illustrated, the memory 1160 may include a mapping module 1170 for implementing the above-described functionalities of the mapping algorithm. Further, the memory 1160 may include a control module 1190 for implementing various control functionalities, such as controlling the radio interface 1110, sending data to a wireless device, receiving data from a wireless device, or the like.

It is to be understood that the structures as illustrated in FIG. 11 are merely schematic and that the network node may actually include further components which, for the sake of clarity, have not been illustrated, e.g., further interfaces or processors. Also, it is to be understood that the memory 1160 may include further types of program code modules, which have not been illustrated, e.g., program code modules for implementing known functionalities of a network node. According to some embodiments, also a computer program may be provided for implementing functionalities of the network node, e.g., in the form of a physical medium storing the program code and/or other data to be stored in the memory 1160 or by making the program code available for download or by streaming.

As can be seen, the concepts as described above may be used for efficiently mapping different types of control data to one or multiple uplink control channel resources. Comparatively large amounts of different control data is handled in an efficient way as regards required complexity for mapping the data to transmission resources as well as efficient usage of transmission resources. For example, a large number of downlink component carriers can be efficiently supported. In some embodiments, CSI reporting is improved at the same time. Further compatibility to earlier wireless communication networks is supported.

It is to be understood that the examples and embodiments as explained above are merely illustrative and susceptible to various modifications. For example, the illustrated concepts may be applied in connection with various radio access technologies, without limitation to the above-mentioned LTE radio access technology. Moreover, it is to be understood that the above concepts may be implemented by using correspondingly designed software to be executed by one or more processors of an existing device, or by using dedicated device hardware.

Moreover, it is to be understood that the above concepts may be implemented by using correspondingly designed software to be executed by one or more processors of an existing device, or by using dedicated device hardware. Also, the devices as described herein may be implemented by a single device or by a system of multiple component devices. For example, the above-mentioned network node of a wireless communication network could be implemented by system in which the illustrated functionalities are distributed over two or more devices.

What is claimed is:

1. A wireless device in a wireless communication network for sending control data, the wireless device comprising:
    a radio interface for communicating with a base station in the wireless communication network;
    processing circuitry operatively connected to the radio interface and configured to:
        receive, from a network node, information on a set of downlink component carriers configured for the wireless device;

receive, from the network node, an indication of one or multiple uplink control channel resources;

map first control data comprising control data for the set of configured downlink component carriers to a first part of the one or multiple uplink control channel resources;

map second control data to a remaining part of the one or multiple uplink control channel resources; and send the first and second control data in the one or multiple uplink control channel resources according to the mapping of the first and second control data.

2. The wireless device according to claim 1, wherein the second control data comprises one or multiple reports each associated with one downlink component carrier of the set of configured downlink component carriers.

3. The wireless device according to claim 2, wherein at maximum one report is mapped to an uplink control channel resource.

4. The wireless device according to claim 2, wherein one report is mapped to multiple uplink control channel resources.

5. The wireless device according to claim 2, wherein multiple reports are mapped to one uplink control channel resource.

6. The wireless device according to claim 2, wherein the processing circuitry is further configured to receive, from a network node, an indication of a maximum number of reports to be included in the indicated one or multiple uplink control channel resources.

7. The wireless device according to claim 2, wherein the processing circuitry is further configured to receive, from a network node, an indication of a maximum number of reports to be included in one of the uplink control channel resources.

8. The wireless device according to claim 1, wherein the second control data is mapped according to a priority rule.

9. The wireless device according to claim 1, wherein second control data having highest priority is mapped to the remaining part of the uplink control channel resource having the largest remaining part.

10. The wireless device according to claim 1, wherein the first control data comprises HARQ feedback for the configured downlink component carriers and/or scheduling request of the wireless device.

11. The wireless device according to claim 1, wherein first control data is mapped such that at least one of the uplink control channel resources is completely filled by first control data.

12. The wireless device according to claim 1, wherein first control data is mapped such that first control data is evenly distributed over the indicated one or multiple uplink control channel resources.

13. A network node in a wireless communication network for receiving control data, the network node comprising:

a radio interface for communicating with a wireless device in the wireless communication network;

processing circuitry operatively connected to the radio interface and configured to:

send to a wireless device information on a set of downlink component carriers configured for the wireless device;

send to the wireless device an indication of the one or multiple uplink control channel resources;

map first control data comprising control data for the set of configured downlink component carriers to a first part of the one or multiple uplink control channel resources; and map second control data to a remaining part of the one or multiple uplink control channel resources; and receive the first and second control data in the one or multiple uplink control channel resources according to the mapping of the first and second control data.

14. The network node according to claim 13, wherein the second control data comprises one or multiple reports each associated with one downlink component carrier of the set of configured downlink component carriers.

15. The network node according to claim 14, wherein at maximum one report is mapped to an uplink control channel resource.

16. The network node according to claim 14, wherein one report is mapped to multiple uplink control channel resources.

17. The network node according to claim 14, wherein multiple reports are mapped to one uplink control channel resource.

18. The network node according to claim 14, wherein the processing circuitry is further configured to send, to the wireless device, an indication of a maximum number of reports to be included in the indicated one or multiple uplink control channel resources.

19. The network node according to claim 14, wherein the processing circuitry is further configured to send, to the wireless device, an indication of a maximum number of reports to be included in one of the uplink control channel resource.

20. The network node according to claim 13, wherein the second control data is mapped according to a priority rule.

21. The network node according to claim 13, wherein second control data having highest priority is mapped to the remaining part of the uplink control channel resource having the largest remaining part.

22. The network node according to claim 13, wherein the first control data comprises HARQ feedback for the configured downlink component carriers and/or scheduling request of the wireless device.

23. The network node according to claim 13, wherein first control data is mapped such that at least one of the uplink control channel resources is completely filled by first control data.

24. The network node according to claim 13, wherein first control data is mapped such that first control data is evenly distributed over the indicated one or multiple uplink control channel resources.

25. A non-transitory computer-readable medium storing executable instructions that, when executed by processing circuitry in a wireless device in a wireless communication network, causes the wireless device to: receive, from a network node, information on a set of downlink component carriers configured for the wireless device; receive, from the network node, an indication of one or multiple uplink control channel resources; map first control data comprising control data for the set of configured downlink component carriers to a first part of the one or multiple uplink control channel resources; map second control data to a remaining part of the one or multiple uplink control channel resources; and send the first and second control data in the one or multiple uplink control channel resources according to the mapping of the first and second control data.

26. A non-transitory computer-readable medium storing executable instructions that, when executed by processing circuitry in a network node in a wireless communication network, causes the network node to: send to a wireless device information on a set of downlink component carriers configured for the wireless device; send to the wireless device an indication of the one or multiple uplink control channel resources; map first control data comprising control data for the set of configured downlink component carriers to a first part of the one or multiple uplink control channel resources; and map second control data to a remaining part of the one or multiple uplink control channel resources; and receive the first and second control data in the one or multiple uplink control channel resources according to the mapping of the first and second control data.

27. A method implemented by a wireless device in a wireless communication network for sending control data, the method comprising:
- receiving, from a network node, information on a set of downlink component carriers configured for the wireless device;
- receiving, from the network node, an indication of one or multiple uplink control channel resources;
- mapping first control data comprising control data for the set of configured downlink component carriers to a first part of the one or multiple uplink control channel resources;
- mapping second control data to a remaining part of the one or multiple uplink control channel resources; and
- sending the first and second control data in the one or multiple uplink control channel resources according to the mapping of the first and second control data.

28. A method implemented by a network node in a wireless communication network for receiving control data, the method comprising:
- sending to a wireless device information on a set of downlink component carriers configured for the wireless device;
- sending to the wireless device an indication of the one or multiple uplink control channel resources;
- mapping first control data comprising control data for the set of configured downlink component carriers to a first part of the one or multiple uplink control channel resources; and
- map second control data to a remaining part of the one or multiple uplink control channel resources; and
- receiving the first and second control data in the one or multiple uplink control channel resources according to the mapping of the first and second control data.

* * * * *